(12) United States Patent
Vieira et al.

(10) Patent No.: US 11,705,976 B2
(45) Date of Patent: Jul. 18, 2023

(54) BEAMFORMING CALIBRATION (71) Applicant: Telefonaktiebolaget LM Ericsson (publ), Stockholm (SE)

(72) Inventors: Joao Vieira, Hjärup (SE); Andres Reial, Höllviken (SE); Muris Sarajlic, Malmö (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 17/780,879

(22) PCT Filed: Dec. 16, 2019

(86) PCT No.: PCT/EP2019/085269
§ 371 (c)(1),
(2) Date: May 27, 2022

(87) PCT Pub. No.: WO2021/121538
PCT Pub. Date: Jun. 24, 2021

(65) Prior Publication Data
US 2023/0010448 A1    Jan. 12, 2023

(51) Int. Cl.
  *H04B 17/12*   (2015.01)
  *H04B 17/14*   (2015.01)
  *H04B 7/06*    (2006.01)
(52) U.S. Cl.
  CPC ........... *H04B 17/12* (2015.01); *H04B 7/0617* (2013.01); *H04B 17/14* (2015.01)
(58) Field of Classification Search
  CPC ...... H04B 17/12; H04B 7/0617; H04B 17/14; H04B 17/11

(Continued)

(56) References Cited

U.S. PATENT DOCUMENTS

| 8,891,598 | B1 | 11/2014 | Wang et al. |
| 2012/0020396 | A1* | 1/2012 | Hohne ........... H01Q 3/267 375/224 |

(Continued)

FOREIGN PATENT DOCUMENTS

| CN | 204103864 U | 1/2015 |
| EP | 3413477 A1 | 12/2018 |
| WO | 2014141068 A1 | 9/2014 |

OTHER PUBLICATIONS

PCT International Search Report, dated Aug. 28, 2020, in connection with International Application No. PCT/EP2019/085269, all pages.

(Continued)

*Primary Examiner* — Fitwi Y Hailegiorgis
(74) *Attorney, Agent, or Firm* — Leffler Intellectual Property Law, PLLC (57) ABSTRACT

A method of beamforming calibration is disclosed for a multi-antenna transceiver configured to communicate with one or more other transceivers. The multi-antenna transceiver has a plurality of transceiver chains connectable to respective antenna elements of the multi-antenna transceiver. Each transceiver chain comprises a transmitter path and a receiver path. The method comprises (for each transceiver chain) feeding an analog signal from the transmitter path to the receiver path via connection circuitry between the transmitter path and the receiver path to provide a digital calibration signal, and determining a beamforming calibration factor for the transceiver chain based on the digital calibration signal. Corresponding apparatus, multi-antenna transceiver, wireless communication node, and computer program product are also disclosed.

20 Claims, 3 Drawing Sheets

(58) Field of Classification Search
USPC .......................................................... 375/267
See application file for complete search history.

(56) References Cited

U.S. PATENT DOCUMENTS

2014/0269554 A1* 9/2014 Shapira .................. H04B 17/18
370/329
2018/0191418 A1  7/2018 Xia et al.

OTHER PUBLICATIONS

PCT Written Opinion, dated Aug. 8, 2020, in connection with International Application No. PCT/EP2019/085269, all pages.
Chen, L. et al., "Overview on the Phase Conjugation Techniques of the Retradirective Array", Hindawi Publishing Corporation, International Journal of Antennas and Propagation, vol. 2010, Article ID 564357, 2010, pp. 1-10.
Taiwan Office Action dated Aug. 12, 2021 in connection with Taiwan Application No. 109144225, 8 pages.
English language translation of Taiwan Office Action dated Aug. 12, 2021 in connection with Taiwan Application No. 109144225, 4 pages.

* cited by examiner

BEAMFORMING CALIBRATION

TECHNICAL FIELD

The present disclosure relates generally to the field of wireless communication. More particularly, it relates to beamforming calibration for a multi-antenna transceiver.

BACKGROUND

There exist various approaches for beamforming calibration of a multi-antenna transceiver. A first group of such approaches involves using an internal calibration network in the multi-antenna transceiver device, which has the drawback of requiring high complexity in terms of hardware and/or software. A second group of such approaches involves over-the air signaling, which has several drawbacks, e.g., dependency on the radio channel, and signaling overhead.

Therefore, there is a need for alternative approaches for beamforming calibration of a multi-antenna transceiver.

Preferably, such approaches have one or more of the following advantages: being less complex than internal calibration network approaches, requiring less signaling overhead than over-the air signaling approaches, being independent on the radio channel, and scaling well (i.e., growing slowly in terms of the previous mentioned aspects such as complexity and overhead) when the number of antenna elements increases.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method of beamforming calibration for a multi-antenna transceiver (e.g., a wireless communication device, such as a network node or a terminal) configured to communicate with one or more other transceivers (e.g., other wireless communication devices, such as terminals or network nodes). The multi-antenna transceiver has a plurality of transceiver chains connectable to respective antenna elements of the multi-antenna transceiver, and each transceiver chain comprises a transmitter path and a receiver path.

The method comprises (for each transceiver chain) feeding an analog signal from the transmitter path to the receiver path via connection circuitry between the transmitter path and the receiver path to provide a digital calibration signal, and determining a beamforming calibration factor for the transceiver chain based on the digital calibration signal.

In some embodiments, the digital calibration signal corresponds to an inversion of the analog signal being passed through the receiver path.

In some embodiments, the inversion of the analog signal is provided by conjugating and normalizing the analog signal.

In some embodiments, normalizing the analog signal comprises scaling the analog signal.

In some embodiments, conjugating the analog signal comprises mixing the analog signal with a tone having a frequency which is twice of a carrier frequency and applying a filter passing the carrier frequency.

In some embodiments, conjugating the analog signal comprises mixing the analog signal with a tone having a carrier frequency, wherein a quadrature component is negated, and applying a phase compensation factor.

In some embodiments, the method further comprises compensating a digital reception signal, resulting from the analog signal being fed from the transmitter path to the receiver path via the connection circuitry, based on a corresponding digital transmission signal to provide the digital calibration signal.

In some embodiments, each beamforming calibration factor represents a ratio between receiver path gain and transmitter path gain for a corresponding transceiver chain.

In some embodiments, the method further comprises performing channel estimation.

In some embodiments, the method further comprises beamforming a communication signal based on the transmission channel estimation and based on the determined beamforming calibration factors, and transmitting the communication signal to the one or more other transceivers.

In some embodiments, performing channel estimation comprises performing reception channel estimation, and beamforming the communication signal based on the channel estimation and based on the determined beamforming calibration factors comprises computing a beamformer using un-calibrated reception channel estimates and applying the determined beamforming calibration factors to the computed beamformer.

In some embodiments, the beamforming calibration is for providing reciprocity between a transmission channel and a reception channel.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for beamforming calibration of a multi-antenna transceiver configured to communicate with one or more other transceivers.

The apparatus comprises a plurality of transceiver chains connectable to respective antenna elements of the multi-antenna transceiver.

Each transceiver chain comprises a transmitter path and a receiver path, and feeding circuitry (including connection circuitry between the transmitter path and the receiver path) configured to feed an analog signal from the transmitter path to the receiver path via the connection circuitry to provide a digital calibration signal.

The apparatus also comprises controlling circuitry configured to cause (for each of the transceiver chains) determination of a beamforming calibration factor for the transceiver chain based on the corresponding digital calibration signal.

A fourth aspect is an apparatus for beamforming calibration of a multi-antenna transceiver configured to communicate with one or more other transceivers.

The apparatus comprises a plurality of transceiver chains connectable to respective antenna elements of the multi-antenna transceiver.

Each transceiver chain comprises a transmitter path, a receiver path, and a connector between the transmitter path and the receiver path. The connector is configured to feed an analog signal from the transmitter path to the receiver path to provide a digital calibration signal.

The apparatus also comprises a determiner configured to determine (for each of the transceiver chains) a beamforming calibration factor for the transceiver chain based on the corresponding digital calibration signal.

A fifth aspect is a multi-antenna transceiver comprising the apparatus of any of the third and fourth aspects.

A sixth aspect is a wireless communication device comprising the apparatus of any of the third and fourth aspects or the multi-antenna transceiver of the fifth aspect.

In some embodiments, any of the above aspects may additionally have features identical with or corresponding to any of the various features as explained above for any of the other aspects.

Generally, even though embodiments will be described herein with reference to communication over reciprocal radio channels, it should be noted that some embodiments are equally applicable and/or useful for non-reciprocity scenarios.

A first advantage of some embodiments is that alternative approaches for beamforming calibration of a multi-antenna transceiver are provided.

A second advantage of some embodiments is that lower complexity (e.g., less dedicated hardware) is required than for internal calibration network approaches.

A third advantage of some embodiments is that less signaling overhead is required than for over-the-air signaling approaches. For example, the solution of some embodiments does not require any dedicated calibration signaling at all, but can utilize signals transmitted for other purposes (e.g., data signals). Thus, no signaling overhead is required for calibration, and the calibration can be performed online (during data communication).

A fourth advantage of some embodiments is independency of the radio channel.

A fifth advantage of some embodiments is that all transceiver chains can be calibrated simultaneously.

A sixth advantage of some embodiments is that the solution scales well (complexity grows slowly, e.g., linearly) with an increasing number of antenna elements and/or an increasing number of transceiver chains.

Some embodiments allow reciprocity-based transmission over what is effectively a calibrated reciprocal reverse/forward channel, without resorting to explicit calibration networks or over-the-air calibration signaling.

One advantage of some embodiments of the proposed internal calibration approach is that it can be performed online and that it does not require any allocation of dedicated over-the-air resources (e.g., time and/or frequency resources). This is because any transmitted signal can be used as a sounding signal for calibration (e.g., if the receiver path is otherwise idle during the transmission) since the content of the sounding signal is known and available to aid post-processing of the received signals of the receiver path.

The solution according to some embodiments is implemented per transceiver chain and therefore scales well with growing system size, which makes it suitable (e.g., from a cost efficiency perspective) for mass production.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the Figures, different reference numbers are used to represent items that may constitute the same feature according to some embodiments. For example, in some embodiments, the transceiver chains 101, 102, 103 and the antenna elements 111, 112, 113 of FIG. 1 may coincide with the transceiver chains 320, 330 and the antenna elements 301, 302 of FIG. 3 and/or with the transceiver chains 420, 430 and the antenna elements 401, 402 of FIG. 4.

In the following, embodiments will be described for beamforming calibration of a multi-antenna transceiver. The multi-antenna transceiver may, for example, be comprisable or comprised in a wireless communication device, such as a network node (e.g., a radio access node) or a terminal (e.g., a user equipment, UE).

A first advantage of some embodiments is that alternative approaches for beamforming calibration of a multi-antenna transceiver are provided.

A second advantage of some embodiments is that lower complexity (e.g., less dedicated hardware) is required than for internal calibration network approaches.

A third advantage of some embodiments is that less signaling overhead is required than for over-the air signaling approaches. For example, the solution of some embodiments does not require any dedicated calibration signaling at all, but can utilize signals transmitted for other purposes (e.g., data signals). Thus, no signaling overhead is required for calibration, and the calibration can be performed online (during data communication).

A fourth advantage of some embodiments is independency of the radio channel.

A fifth advantage of some embodiments is that all transceiver chains can be calibrated simultaneously.

A sixth advantage of some embodiments is that the solution scales well (complexity grows slowly, e.g., linearly) with an increasing number of antenna elements and/or an increasing number of transceiver chains.

Some embodiments allow reciprocity-based transmission over what is effectively a calibrated reciprocal reverse/forward channel, without resorting to explicit calibration networks or over-the-air calibration signaling.

One advantage of some embodiments of the proposed internal calibration approach is that it can be performed online and that it does not require any allocation of dedicated over-the-air resources (e.g., time and/or frequency resources). This is because any transmitted signal can be used as a sounding signal for calibration (e.g., if the receiver path is otherwise idle during the transmission) since the content of the sounding signal is known and available to aid post-processing of the received signals of the receiver path.

The solution according to some embodiments is implemented per transceiver chain and therefore scales well with growing system size, which makes it suitable (e.g., from a cost efficiency perspective) for mass production.

Figure 1:
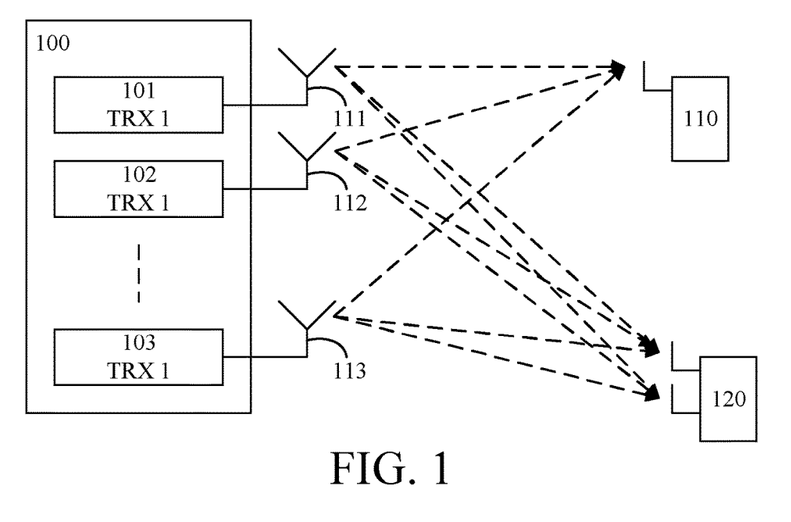
FIG. 1 is a schematic drawing illustrating an example communication scenario according to some embodiments.

FIG. 1 schematically illustrates an example communication scenario wherein some embodiments may be useful. This scenario shows a multi-antenna transceiver 100 (e.g., of a base station) configured to communicate with one or more other transceivers 110, 120 (e.g., of respective user equipment). The multi-antenna transceiver 100 has a plurality of transceiver chains (TRX 1, TRX 2, TRX 3) 101, 102, 103, each of which is connectable to respective antenna element 111, 112, 113 of the multi-antenna transceiver. FIG. 1 also schematically illustrates the radio channel between each pair of an antenna element of the multi-antenna transceiver 100 and an antenna element of any of the other transceivers 110, 120.

When beamformed communication is to take place (e.g., in a scenario such as that of FIG. 1), characteristics of the radio channels are typically acquired and used to determine a suitable beamforming setting. However, the effective communication channel is typically affected, not only by the radio channel conditions, but also by characteristics of the transceiver chains in the transmitting and receiving devices. Therefore, knowledge (or estimation) of transceiver chain characteristics may improve the determination of a suitable beamforming setting. Typically, transceiver chain characteristics are used to calibrate the beamforming.

Embodiments disclosed herein provides a determination of transceiver chain characteristics for a multi-antenna transceiver in the form of a beamforming calibration factor per transceiver chain. As will be realized in the following, this may be efficiently achieved by performing the determination for each transceiver chain in isolation—contrary to approaches using an internal calibration network or involving over-the air signaling, where signaling between each pair of transmitter path and receiver path (i.e., also pairs with paths from two different transceiver chains) typically needs to be considered.

Figure 2:
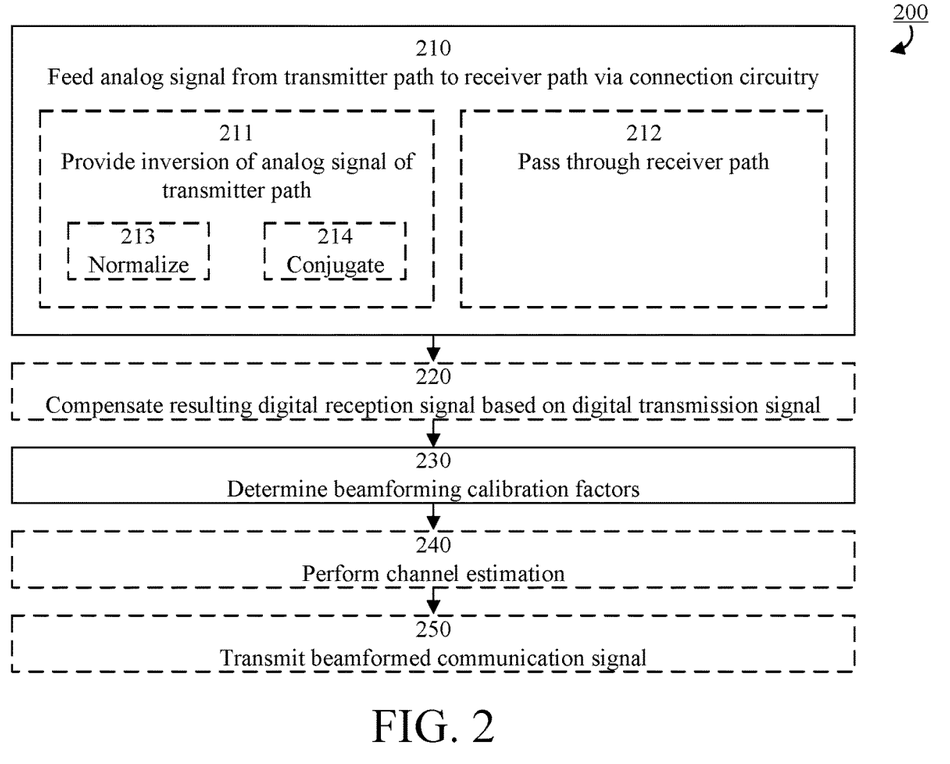
FIG. 2 is a flowchart illustrating example method steps according to some embodiments.

FIG. 2 illustrates an example method 200 according to some embodiments. The method is a method of beamforming calibration for a multi-antenna transceiver (compare with 100 of FIG. 1) configured to communicate with one or more other transceivers, and having a plurality of transceiver chains (compare with 101, 102, 103 of FIG. 1) connectable to respective antenna elements of the multi-antenna transceiver (compare with 111, 112, 113 of FIG. 1).

Each transceiver chain comprises a transmitter path and a receiver path. A transmitter path may be defined in terms of the cascade of all (or part) of the processing (e.g., processing units/blocks/modules/circuitry) taking place between a data source (e.g., an in-phase/quadrature data source) and the antenna element (possibly including hardware circuitry and components associated with the antenna element). Typically, a transmitter path may be defined as comprising all (or part) of the functional elements for analog processing of a signal to be transmitted; e.g., the circuitry between a digital signal processor and an antenna switch/duplexer/port. A receiver path may be defined in terms of the cascade of all (or part) of the processing (e.g., processing units/blocks/modules/circuitry) taking place between the antenna element (possibly including hardware circuitry and components associated with the antenna element) and a data sink (e.g., an in-phase/quadrature data sink). Typically, a receiver path may be defined as comprising all (or part) of the functional elements for analog processing of a received signal; e.g., the circuitry between an antenna switch/duplexer/port and a digital signal processor.

In some embodiments, the beamforming calibration of the method 200 is for providing reciprocity—or a certain degree of reciprocity—between an uplink channel (assumed transmission channel) and a downlink channel (assumed reception channel). Full reciprocity typically involves calibration at both ends of a communication link; since both end transceivers may have non-reciprocal hardware. The term "a certain degree of reciprocity" may refer to calibration of at least one end of a communication link.

In step 210, an analog signal is fed from the transmitter path to the receiver path via connection circuitry between the transmitter path and the receiver path. The connection circuitry typically connects to the transmitter and receiver paths as close as possible to the antenna switch/duplexer/port of the transceiver chain. The connection circuitry makes it possible to exchange signals between a certain point of the transmitter path and a certain point of the receiver path while avoiding using over the air signals for beamforming calibration.

Step 210 is performed per transceiver chain (i.e., the transmitter path and the receiver path are comprised in the same transceiver chain; connectable to the same antenna element). Typically no feeding as that of step 210 takes place from a transmitter path of one transceiver chain to a receiver path of another transceiver chain. Also typically, there is no connection circuitry adapted to feed from a transmitter path of one transceiver chain to a receiver path of another transceiver chain. This makes the approach efficient in terms of complexity (e.g., in terms of hardware complexity).

Step 210 is performed to provide a digital calibration signal of the transceiver chain under consideration. In step 230, a beamforming calibration factor is determined for the transceiver chain based (only) on the digital calibration signal; and not based on any information of other transceiver chains.

In some embodiments, the beamforming calibration factor represents a (possibly scaled) ratio between receiver path gain and transmitter path gain for the transceiver chain under consideration. Thus, the digital calibration signal is provided such that it corresponds to an inversion of the analog signal being passed through the receiver path, as illustrated by optional sub-steps 211 and 212. A motivation for this preference will be given later herein.

Generally, the definition of inversion of an analog signal (e.g., a radio frequency—RF—signal, such as an analog narrowband signal; for example, a high frequency tone), may be in terms of its baseband point of view, i.e., the complex number representing the inverted signal is the inverse of the complex number representing the baseband representation of the output signal of the transmitter path. Thus, the analog signal itself may not necessarily be inverted (such inversion may typically cause singularities at the zero crossings).

In accordance with the previous definition, inversion of the analog signal may be provided (e.g., implemented) by conjugating and normalizing the analog signal, as illustrated by optional sub-sub-steps 213 and 214.

Normalization of a signal may typically refer to division of the signal by its squared absolute value (i.e., corresponding to the energy or power of the signal). When the signal power is static, a fixed normalization value may be used. When the signal power is semi-static or varying relatively slowly, a normalization value may be used which is updated seldom (e.g., with some periodicity and/or based on a triggering event).

In some embodiments, normalizing the analog signal may comprise scaling (wherein scaling is generally meant to include attenuating and/or amplifying, as applicable) the analog signal. The scaling may, for example, be implemented by the connection circuitry or by the receiver path.

Conjugation of a signal may typically refer to changing the sign of the phase of the signal.

In some embodiments, conjugating the analog signal may comprise mixing the analog signal with a tone having a frequency which is twice of a carrier frequency (typically, the carrier frequency of the analog signal) and applying a filter passing the carrier frequency (e.g., passing the resulting signal).

Generally, when it is said herein that a filter passes the carrier frequency, it should be understood as the filter being configured to pass a suitable frequency range comprising the carrier frequency. For example, the filter typically passes (at least a substantial portion of) the signal part resulting from the mixing which is centered around the carrier frequency. The filter may, for example, be any suitable band-pass or low-pass filter.

The conjugation according to these embodiments may, for example, be implemented by the connection circuitry. Thus, if the scaling is also implemented by the connection circuitry, sub-steps 211 and 212 are performed in sequence; first inverting using the connection circuitry, then passing the inverted signal through the receiver path.

In some embodiments, conjugating the analog signal may comprise mixing the analog signal with a tone having a carrier frequency, wherein a quadrature component is negated, and applying a phase compensation factor. The phase compensation factor may, for example, be determined based on offline measurements of the receiver hardware upstream from the mixing point, and may be tabulated for later use.

The conjugation according to these embodiments may, for example, be implemented by the receiver path (e.g., mixing by using a mixer normally used for down-converting received signals) and/or a digital signal processor (e.g., applying the phase compensation factor in the digital domain). Thus, sub-steps 211 and 212 are performed at least partly in parallel; conjugating (and possibly also normalizing) the signal while passing it through the receiver path.

In optional step 220, a compensation is performed to remove any influence of the digital transmission signal (the digital signal producing the analog signal of the transmission path) on the digital calibration signal. This may be particularly useful when the digital transmission signal (e.g., in terms of a symbol value, a sample value, a value used to modulate a subcarrier, etc.) is not equal to one. The compensation may, for example, comprise multiplying a digital reception signal, resulting from the analog signal being fed from the transmitter path to the receiver path via the connection circuitry, with digital transmission signal to provide the digital calibration signal. The digital reception signal may be the signal observable at a digital signal processor, and the compensation may be performed in the digital domain (e.g., by the digital signal processor).

As for step 210, steps 220 and 230 are performed per transceiver chain. Typically, but not necessarily, steps 210, 220, and 230 may be performed per transceiver chain and for all transceiver chains of the multi-antenna transceiver.

In optional step 240, channel estimation is performed.

The method 200 may also comprise beamforming a communication signal based on the channel estimation and based on the determined beamforming calibration factors, and transmitting the communication signal to the one or more other transceivers, as illustrated by optional step 250.

Steps 240 and 250 may be implemented according to any suitable approach.

In some embodiments, the determined beamforming calibration factors may be applied to beamformed (un-calibrated) reception channel estimates. In such embodiments, steps 240 and 250 may comprise performing reception channel estimation, computing a beamformer using (un-calibrated) reception channel estimates, applying the determined beamforming calibration factors to the computed beamformer, and transmitting using the beamformer thus calibrated. An example of this approach will be detailed later herein.

In some embodiments, steps 240 and 250 may comprise performing reception channel estimation, applying the determined beamforming calibration factors to the reception channel estimates to obtain transmission channel estimates, computing a beamformer using transmission channel estimates thus calibrated, and transmitting using the computed beamformer. An example of this approach may be deduced from the example detailed later herein, by using beamforming calibration factors $c_m = \alpha t_m^{BS}/r_m^{BS}$.

In some embodiments (e.g., when channel estimation is performed in beam domain), reference signal measurements may also need to be performed by another transceiver to achieve proper calibration.

Figure 3:
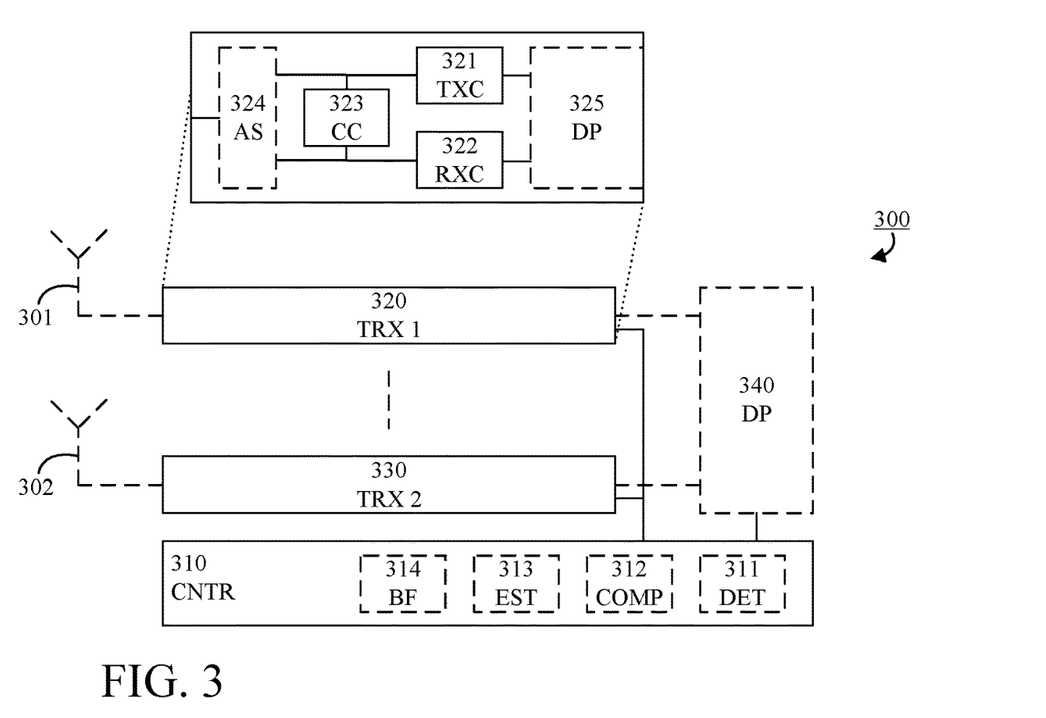
FIG. 3 is a schematic block diagram illustrating an example apparatus according to some embodiments.

FIG. 3 schematically illustrates an example apparatus 300 according to some embodiments. The apparatus is for beamforming calibration of a multi-antenna transceiver (compare with 100 of FIG. 1) configured to communicate with one or more other transceivers (compare with 110, 120 of FIG. 1).

For example, the apparatus may be comprised or comprisable in the multi-antenna transceiver and/or in a wireless communication device, such as a network node (e.g., a radio access node) or a terminal (e.g., a user equipment, UE).

The apparatus 300 may, for example, be adapted to perform one or more of the method steps described in connection to FIG. 2.

In some embodiments, the apparatus is for providing reciprocity between a transmission channel and a reception channel.

The apparatus 300 comprises a plurality of transceiver chains (TRX 1, TRX 2) 320, 330 (compare with 101, 102, 103 or FIG. 1) connectable to respective antenna elements 301, 302 (compare with 111, 112, 113 or FIG. 1) of the multi-antenna transceiver. The apparatus may also comprise a digital processor (DP; e.g., digital processing circuitry or a digital processing unit such as a digital signal processor— DSP). The digital processor may be shared between the transceiver chains as illustrated by 340 and/or (a portion of) the digital processor may be dedicated to a transceiver chain as illustrated by 325.

A (typically each) transceiver chain 320, 330 comprises a transmitter path and a receiver path. The transmitter path comprises transmission circuitry (TXC) 321 and the receiver path comprises reception circuitry (RXC) 322. A transceiver chain may also comprise an antenna switch (AS) 324 or similar circuitry for conveying signals from the transmitter path to the antenna element and from the antenna element to the receiver path.

A transceiver chain 320, 330 also comprises a connector (CC; e.g., connecting circuitry or a connecting module) 323 between the transmitter path and the receiver path. The connector 323 typically connects the transmitter path to the receiver path using first and second connection points, wherein the first connection point is located between the transmission circuitry 321 and the antenna element 301 and the second connection point is located between the antenna element 301 and the reception circuitry 322.

The connector 323, possibly together with at least a portion of the reception circuitry 322 and/or the digital processor 325, 340 form feeding circuitry, which is configured to feed an analog signal from the transmitter path to the receiver path via the connection circuitry to provide a digital calibration signal (compare with step 210 of FIG. 2).

The apparatus 300 also comprises a controller (CNTR; e.g., controlling circuitry or a controlling module) 310. The controller 310 is configured to cause determination of a beamforming calibration factor for each of the transceiver chains based on the corresponding digital calibration signal (compare with step 230 of FIG. 2).

To this end, the controller 310 may comprise a determiner (DET; e.g., determining circuitry or a determining module) 311. The determiner may be configured to determine the beamforming calibration factor for each of the transceiver chains based on the corresponding digital calibration signal.

In some embodiments, the feeding circuitry may be configured to provide the digital calibration signal as corresponding to an inversion of the analog signal being passed through the receiver path (compare with 211, 212 of FIG. 2). For example, the feeding circuitry may be configured to conjugate and normalize the analog signal to provide the inversion of the analog signal (compare with 213, 214 of FIG. 2).

The feeding circuitry may be configured to scale the analog signal to normalize the analog signal. To this end, the connector 323 and/or the reception circuitry 322 may comprise a scaler (e.g., an attenuator and/or an amplifier) configured to scale the analog signal to normalize the analog signal.

According to a first example, the feeding circuitry may be configured to mix the analog signal with a tone having a frequency which is twice of a carrier frequency and apply a filter passing the carrier frequency to conjugate the analog signal. To this end the connector 323 may comprise a mixer (e.g., mixing circuitry or a mixing module) configured to mix the analog signal with the tone having a frequency which is twice of a carrier frequency and a filter configured to pass the carrier frequency.

The mixers of different transceiver chains may use a shared oscillator source according to some embodiments. This provides the advantage that there will be no oscillator mismatch between the transceiver chains in relation to the conjugation of the analog signal. Alternatively, the mixer of a transceiver chain may use a transceiver chain specific oscillator source.

In some embodiments, the connector may comprise the scaler, the mixer, and the filter connected in series between the first and second connection points. In some embodiments, the connector may comprise the mixer and a single functional component implementing scaling and filtering connected in series between the first and second connection points.

According to a second example, the feeding circuitry may be configured to mix the analog signal with a tone having a carrier frequency, wherein a quadrature component is negated, and apply a phase compensation factor to conjugate the analog signal. To this end the reception circuitry 322 may comprise a mixer (e.g., mixing circuitry or a mixing module) configured to mix the analog signal with a tone having a carrier frequency, wherein a quadrature component is negated, and the digital processor 325, 340 may comprise a phase compensator (e.g., phase compensating circuitry or a phase compensating module) configured to apply the phase compensation factor.

In some embodiments, the mixer may be an in-phase/quadrature mixer normally used for down-converting received signals, wherein the oscillator signal of the quadrature mixer has a phase difference of −90 degrees relative the oscillator signal of the in-phase mixer (instead of the phase difference of 90 degrees used for down-conversion of received signals).

In some embodiments, the controller 310 and/or the digital processor 340, 325 may be further configured to cause compensation of (e.g., compensate) a digital reception signal, resulting from the analog signal being fed from the transmitter path to the receiver path via the connection circuitry, based on a corresponding digital transmission signal to provide the digital calibration signal (compare with step 220 of FIG. 2). To this end the controller 310 and/or the digital processor 340, 325 may comprise a compensator (COMP; e.g., compensating circuitry or a compensating module) 312 configured to compensate the digital reception signal based on a corresponding digital transmission signal to provide the digital calibration signal.

In some embodiments, the controller 310 may be further configured to cause channel estimation (compare with step 240 of FIG. 2). To this end the controller 310 may comprise an estimator (EST; e.g., estimating circuitry or an estimating module) 313 configured to cause channel estimation.

In some embodiments, the controller 310 may be further configured to cause beamforming of a communication signal based on the channel estimation and based on the determined beamforming calibration factors, and transmission of the communication signal to the one or more other transceivers (compare with step 250 of FIG. 2). To this end the controller 310 may comprise a beamformer (BF; e.g., beamforming circuitry or a beamforming module) 314 configured to beamform the communication signal based on the channel estimation and based on the determined beamforming calibration factors.

Figure 4:
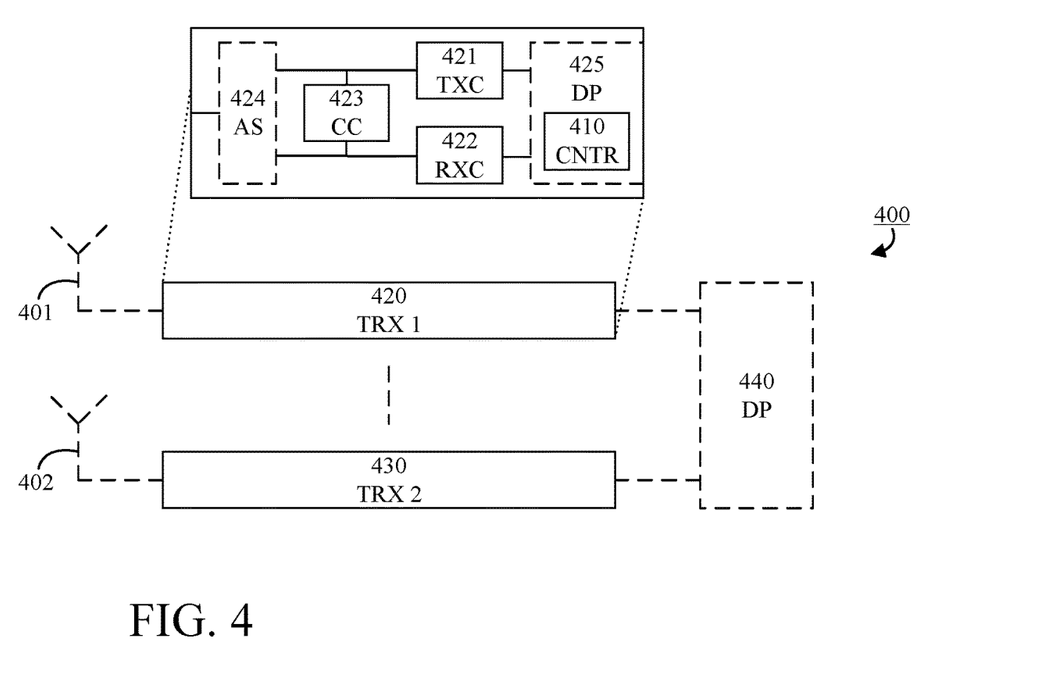
FIG. 4 is a schematic block diagram illustrating an example apparatus according to some embodiments.

FIG. 4 schematically illustrates an example apparatus 400 according to some embodiments. The apparatus is for beamforming calibration of a multi-antenna transceiver (compare with 100 of FIG. 1) configured to communicate with one or more other transceivers (compare with 110, 120 of FIG. 1).

For example, the apparatus may be comprised or comprisable in the multi-antenna transceiver and/or in a wireless communication device, such as a network node (e.g., a radio access node) or a terminal (e.g., a user equipment, UE).

The apparatus 400 may, for example, be adapted to perform one or more of the method steps described in connection to FIG. 2.

The apparatus 400 has some similarities with the apparatus 300 of FIG. 3, and it should be understood that relevant parts of the description of the apparatus 300 may be applied also to the apparatus 400. Therefore, similar elements and/or functions will not be described in detail for the apparatus 400.

The apparatus 400 comprises a plurality of transceiver chains (TRX 1, TRX 2) 420, 430 connectable to respective antenna elements 401, 402 (compare with 111, 112, 113 or FIG. 1) of the multi-antenna transceiver. The apparatus may also comprise a digital processor (DP). The digital processor may be shared between the transceiver chains as illustrated by 440 and/or (a portion of) the digital processor may be dedicated to a transceiver chain as illustrated by 425.

A transceiver chain 420, 430 comprises a transmitter path and a receiver path. The transmitter path comprises transmission circuitry (TXC) 421 and the receiver path comprises reception circuitry (RXC) 422. A transceiver chain may also comprise an antenna switch (AS) 424 or similar circuitry for conveying signals from the transmitter path to the antenna element and from the antenna element to the receiver path.

A transceiver chain 420, 430 also comprises a connector (CC; e.g., connecting circuitry or a connecting module) 423 between the transmitter path and the receiver path.

The connector 423, possibly together with at least a portion of the reception circuitry 422 and/or the digital processor 425, 440 form feeding circuitry, which is configured to feed an analog signal from the transmitter path to the receiver path via the connection circuitry to provide a digital calibration signal.

The apparatus 400 also comprises a controller (CNTR; e.g., controlling circuitry or a controlling module) 410. In the apparatus 400, there is a controller 410 dedicated to each transceiver path in contrast to the shared controller 310 illustrated in relation to FIG. 3. The controller 410 is configured to cause determination of a beamforming calibration factor for the transceiver chain based on the corresponding digital calibration signal.

In similarity with what has already been described, the feeding circuitry may be configured to provide the digital calibration signal as corresponding to an inversion of the analog signal being passed through the receiver path, for example, by conjugating, normalizing, and passing the analog signal through the receiver path.

Figure 5:
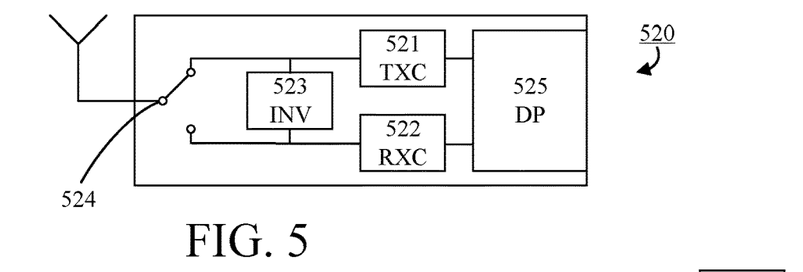
FIG. 5 is a schematic block diagram illustrating an example apparatus according to some embodiments.

FIG. 5 schematically illustrate an example transceiver chain 520 according to some embodiments. The example transceiver chain 520 may, for example, be used as each of the transceiver chains 320, 330, 420, 430 of FIGS. 3 and 4.

The transceiver chain 520 comprises a transmitter path and a receiver path. The transmitter path comprises transmission circuitry (TXC) 521 and the receiver path comprises reception circuitry (RXC) 522. The transceiver chain also comprises an antenna switch 524 and a connector in the form of an inverter (INV; e.g., inverting circuitry or an inverting module) 523 between the transmitter path and the receiver path.

Figure 6:
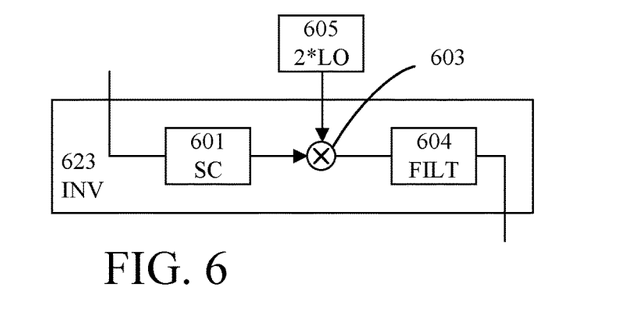
FIG. 6 is a schematic block diagram illustrating an example apparatus according to some embodiments.

FIG. 6 schematically illustrates an example implementation of an inverter (INV) 623 according to some embodiments. The inverter 623 may, for example, be used as the inverter 523 of FIG. 5.

The inverter 623 comprises—connected in series—a scaler (SC; e.g. scaling circuitry or a scaling module) 601 configured to scale (e.g., attenuate and/or amplify) the analog signal to normalize the analog signal, a mixer (e.g., mixing circuitry or a mixing module) 603 configured to mix the analog signal with a tone having a frequency which is twice of a carrier frequency, and a filter (FILT; e.g., filtering circuitry or a filtering module) 604 configured to pass the carrier frequency. The oscillator supplying the tone having a frequency which is twice of a carrier frequency to the mixer 603 may be provided by a shared or dedicated oscillator source 605, schematically labeled 2*LO in FIG. 6.

Returning to FIG. 5, the inverter 523 is part of feeding circuitry configured to feed an analog signal from the transmitter path to the receiver path via the inverter to provide a digital calibration signal in a digital processor (DP) 525. In some embodiments, the digital processor 525 may be configured to compensate a digital reception signal, resulting from the analog signal being fed from the transmitter path to the receiver path via the inverter, based on a corresponding digital transmission signal to provide the digital calibration signal. As explained before, the digital calibration signal is for determination of a beamforming calibration factor for the transceiver chain.

Figure 7:
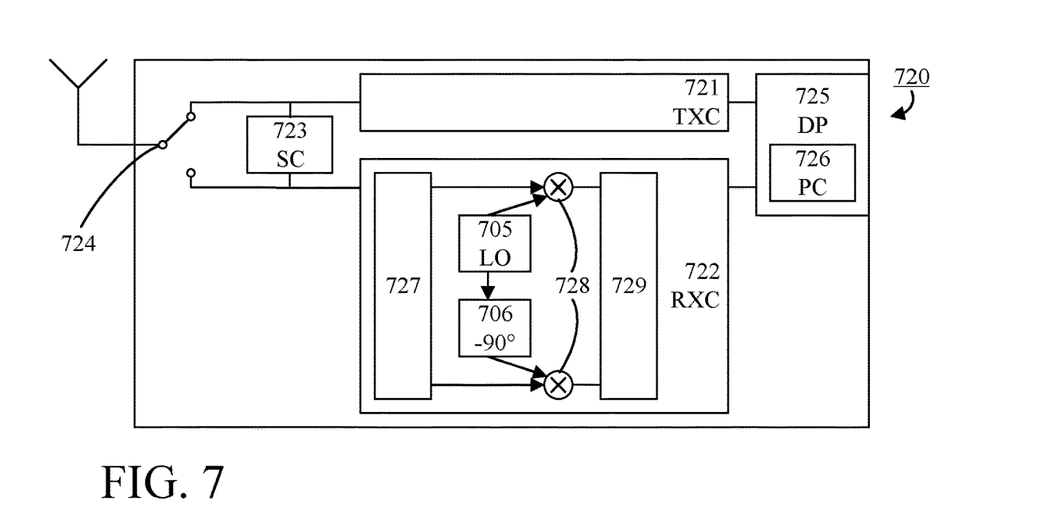
FIG. 7 is a schematic block diagram illustrating an example apparatus according to some embodiments.

FIG. 7 schematically illustrate an example transceiver chain 720 according to some embodiments. The example transceiver chain 720 may, for example, be used as each of the transceiver chains 320, 330, 420, 430 of FIGS. 3 and 4.

The transceiver chain 720 comprises a transmitter path and a receiver path. The transmitter path comprises transmission circuitry (TXC) 721 and the receiver path comprises reception circuitry (RXC) 722. The transceiver chain also comprises an antenna switch 724 and a connector in the form of a scaler (SC; e.g., scaling circuitry or a scaling module) 723 between the transmitter path and the receiver path.

The reception circuitry 722 comprises a mixer (e.g., mixing circuitry or a mixing module) 728 configured to mix the analog signal with a tone having a carrier frequency, wherein a quadrature component is negated. The tone having the carrier frequency is provided by an oscillator (LO) 705, and is phase adjusted by −90 degrees for the quadrature portion of the mixer, as illustrated at 706.

The reception circuitry 722 also comprises a first portion 727 of components upstream of the mixer 728 and a second portion 729 of components downstream of the mixer 728. Since the analog signal of the transmitter path passes the first portion of components 727 before conjugation, the digital processor 725 comprises a phase compensator (PC; e.g., phase compensating circuitry or a phase compensating module) 726 configured to apply a phase compensation factor that conjugates the influence of the first portion of components 727.

The scaler 723, the mixer 728 and the phase compensator 726 are part of feeding circuitry configured to feed an analog signal from the transmitter path to the receiver path via the scaler to provide a digital calibration signal in a digital processor (DP) 725. In some embodiments, the digital processor 725 may be configured to compensate a digital reception signal, resulting from the analog signal being fed from the transmitter path to the receiver path via the inverter, based on a corresponding digital transmission signal to provide the digital calibration signal. As explained before, the digital calibration signal is for determination of a beamforming calibration factor for the transceiver chain.

Embodiments will now be exemplified in relation to a scenario of beamforming calibration for a radio access node adapted for reciprocal multiple-input multiple-output (MIMO) operation; e.g., multi user MIMO (MU-MIMO) operation as illustrated schematically in FIG. 1.

Some wireless communication standards, such as fifth generation new radio (5G NR), rely on spatial beamforming. Therefore, a wireless communication device (e.g., a network node or a terminal) operating according to such standards may be equipped with a plurality of antennas (or antenna elements) and its transceiver may be termed a multi-antenna transceiver.

When the number of antenna element of a device is large enough (e.g., many tens) and the device simultaneously serves many devices in the same time/frequency resource grid, the corresponding MIMO system may be referred to as a massive MIMO system. A challenge of scaling MIMO systems to a large number of antenna elements is that explicit channel estimation becomes very challenging. A reason for this is that the amount of overhead signaling used for training purposes typically scales linearly with the number of antennas (or—correspondingly—with the size of a beamforming code book). Furthermore, measurement reporting (e.g., channel state information—CSI—feedback) which adds to the overhead signaling, may also be needed.

An approach for lowering the signaling overhead is to rely on channel reciprocity and use reverse link (e.g., uplink— UL—for network node transmission, and downlink—DL— for terminal transmission) training signals to estimate forward link (e.g., DL for network node transmission, and UL for terminal transmission) channels for determination of beam forming settings. This approach is supported by 5G NR. For devices having one transceiver chain per antenna element, it is sufficient with one training signal per forward link stream in this approach. This renders the overhead signaling for training proportional to the number of forward link streams, which typically results in much lower signaling overhead than if the overhead signaling for training would scale linearly with the number of antennas.

A problem with the above approach is that, even if the propagation channel (the radio channel) is—or may be considered to be—reciprocal, the analog front-end circuitry at the transmitting device and at the receiving device typically makes the baseband-to-baseband channel (the effective channel) non-reciprocal. Calibration may be used to mitigate this problem.

A first type of calibration approach for restoring the reciprocity of a wireless communication link includes performing measurements based on bi-directional over-the-air signaling between the transmitting and receiving devices, and using the measurement result (typically gathered at one end of the link) to estimate suitable calibration coefficients for the transmitting device and for the receiving device. Bi-directional measurement signaling between both ends of the link for calibration consumes over-the-air resources, and the quality of the calibration depends on the current state of the wireless link. Thus, this type of approach suffers from signaling overhead and dependency on the radio channel.

A second type of calibration approach (local calibration) for restoring the reciprocity of a wireless communication link includes conducting the entire calibration procedure at the device to be calibrated. This type of approach can only ensure a certain level of reciprocity calibration.

The second type of calibration approach can be implemented by using an internal calibration network, where a reference transceiver chain transmits and receives signals to and from all transceiver chains to be calibrated, and the received signals are post-processed to estimate suitable calibration coefficients. Calibration using a calibration network typically requires that a lot of additional hardware circuits are used solely for the purpose of calibration. Furthermore, such circuits do not scale well (grows rapidly) when the number of antenna elements (and transceiver chains) grows. This is because the number of interconnections in the network increases rapidly, as well as the length of each interconnection. Thus, this type of approach suffers from high complexity (in terms of hardware and/or software) and poor scalability with number of antenna elements.

Alternatively, the second type of calibration approach can be implemented by over-the-air signaling between pairs of antenna elements of the device, and the received signals are post-processed to estimate suitable calibration coefficients. Calibration using over-the-air protocols consume system resources because it typically needs to be executed online (e.g., every couple of seconds). Furthermore, the amount of system resources grows rapidly when the number of antenna elements (and transceiver chains) grows. Thus, this type of approach suffers from poor scalability with number of antenna elements and that time (and power) is needed for the over-the-air signaling.

To overcome these and/or other disadvantages, some embodiments suggest a type of calibration approach where a connection circuit links the transmitter path to the receiver path within each transceiver chain (one such connection circuit per transceiver chain and no such connection circuits between different transceiver chains) to implement an inverted version of the analog signal of the transmitter path being passed through the receiver path. Internal measurements according to this approach may provide estimates of the calibration coefficients, which allow calibration of an antenna array for reciprocity operation. Then, the device can estimate the reverse channel by performing measurements using its (un-calibrated) receiver paths, determine (based on the estimates of the reverse channel) a suitable beamforming setting for transmission in the forward channel, and apply a per-element correction term (the calibration coefficient $c_m$) to the transmit signal prior to transmission.

Embodiments will now be exemplified in relation to the following system model which describes a scenario of beamforming calibration for a radio access node adapted for reciprocal (e.g., time division duplex—TDD—based) multiple-input multiple-output (MIMO) operation.

A narrowband MIMO link with M antennas (antenna elements) at one end (side A) and K antennas (antenna elements) on the other end (side B) is assumed. In this example, side A is a fully digital node and is capable to process all M signals, one signal from each antenna, in a joint fashion. Side A may, for example, be a base station (BS) or a fully digital UE with M antennas. Side B may, for example, be a K-antenna UE, K single-antenna UE:s, or a group of UE:s together having K antennas. For illustrative purposes, side A will be exemplified as a base station and side B as K single-antenna UE:s in the following. In a typically massive MIMO scenario, M>>K.

The M×K uplink (UL) narrowband radio channel $H_{UL}$ (representing, e.g., the channel of an orthogonal frequency division multiplex (OFDM) subcarrier, a physical resource block (PRB), or a PRB group) is modelled as:

$$H_{UL} = R_{BS} H T_{UE},$$

where H is of the propagation channel (the radio channel), $T_{UE} = \text{diag}\{t_1^{UE}, \ldots, t_K^{UE}\}$ is a diagonal matrix which models the complex gains of the transmitter paths of the UE:s, and $R_{BS} = \text{diag}\{r_1^{BS}, \ldots, r_M^{BS}\}$ is a diagonal matrix which models the complex gains of the BS receiver paths. The associated DL channel is modelled as:

$$H_{DL} = R_{UE} H^T T_{BS},$$

where $T_{BS} = \text{diag}\{t_1^{BS}, \ldots, t_M^{BS}\}$ is a diagonal matrix which models the complex gains of the BS transmitter paths, and $R_{UE} = \text{diag}\{r_1^{UE}, \ldots, r_K^{UE}\}$ is a diagonal matrix which models the complex gains of the receiver paths of the UE:s.

Within a time/frequency coherence interval, the propagation channel H can be assumed to be reciprocal in this scenario. However, generally, the end-to-end radio channel is not generally reciprocal (i.e., $H_{UL}^T \neq H_{DL}$) due to that the gains (responses) of the transceiver circuitry are not generally reciprocal. Due to this non-reciprocity, it is not immediately obvious how DL transmission can be performed based on UL reference signals. This is a motivation for beamforming calibration, which will now be exemplified by application of a calibration matrix:

$$C = \text{diag}\{c_1, \ldots, c_M\} = \alpha (T_{BS})^{-1} R_{BS},$$

where $\alpha$ denotes a complex-valued (typically unknown) scaling term. Some embodiments provide approaches for how the calibration matrix can be determined—or estimated—by the base station. The usefulness of the calibration matrix can be illustrated as follows.

Via K UL reference signals, one per UE, the BS can estimate $H_{UL}$. If the BS wants to perform zero-forcing (ZF) transmission to the UE:s, it does so by the taking the Moore-Penrose inverse of $H_{UL}^T$, namely $$W = H^*_{UL}(H_{UL}^T H^*_{UL})^{-1},$$

where $(\cdot)^*$ denotes element-wise complex conjugation. However, since W is constructed using UL channel estimations, it is generally not matched to the non-reciprocal DL channel $H_{DL}$. To compensate for this mismatch, the BS may multiply—at each antenna—the pre-coded signal with an entry of C; i.e., multiply the pre-coded signal at antenna m with $c_m$. Then, the effective DL channel can be expressed as:

$$\begin{aligned}
H_{DL_{\text{eff}}} &= H_{DL} CW \\
&= H_{DL} CH^*_{UL}(H_{UL}^T H^*_{UL})^{-1} \\
&= H_{DL} CR^*_{BS} H^* T^*_{UE}(T_{UE} H^T |R_{BS}|^2 H^* T^*_{UE})^{-1} \\
&= H_{DL} \alpha(T_{BS})^{-1} |R_{BS}|^2 H^* T^*_{UE}(T_{UE} H^T |R_{BS}|^2 H^* T^*_{UE})^{-1}, \\
&= H_{DL} \alpha(T_{BS})^{-1} H^{-T}(T_{UE})^{-1} \\
&= \alpha R_{UE} H^T T_{BS}(T_{BS})^{-1} H^{-T}(T_{UE})^{-1} \\
&= \alpha R_{UE}(T_{UE})^{-1}
\end{aligned}$$

which is a diagonal channel matrix with unknown diagonal entries. The unknown diagonal entries can be estimated using only one DL reference signal, beamformed in the DL towards all UE:s, using the calibrated channels. Thus, K UL reference signals plus one DL reference signal are sufficient to conduct all training needed for this reciprocity-based transmission approach. This results in much less training overhead than doing explicit DL channel estimation of all pairs of antennas, or DL beam sweeping, which would consume about M pilot resources and necessitate additional processing at the UE:s.

It should be noted that zero-forcing (ZF) is merely an example and that similar spatial multiplexing advantages are also present in other cases, e.g., linear minimum mean square error (MMSE) transmission, maximum ratio transmission (MRT), multiple antenna UE:s, and/or multiple layer transmission.

In conclusion, knowledge of the ratios $C = \text{diag}\{c_1, \ldots, c_m\}$, $c_m = \alpha_m^{BS}/t_m^{BS}$ may enable DL transmission with no inter-user interference over what is effectively a calibrated UL/DL channel setup, without resorting to explicit calibration networks or over-the-air calibration signals at the BS. The matrix C can thus be seen as a calibration matrix and some embodiments presented herein (e.g., FIGS. 3-7) provide an apparatus to estimate each entry of C; i.e., determining the beamforming calibration factor $c_m$ for each transceiver chain m=1, ..., M.

Application of any of the approaches described earlier herein (e.g., FIGS. 3-7) to this scenario enables the BS transceiver to perform an internal measurement by "siphoning" a transmitted DL signal to the receiver path. Performed at BS transceiver m, such a measurement may be modelled as:

$$y_m^{cal} = \frac{r_m^{BS}}{t_m^{BS} p},$$

where p denotes the input signal of the transmitter path. If p=1, then $y_m^{cal}$ equals the calibration coefficient $c_m$.

If p≠1, (digital) post processing may be used to remove its effect provided that knowledge of the input signal of the transmitter path is available (which it typically is in the digital domain of a transceiver chain). Thus, the signal p can also refer to one complex-valued data-bearing symbol, e.g., transmitted at one subcarrier (for example, one subcarrier of a physical downlink shared channel—PDSCH—OFDM symbol), or to a complex-valued reference symbol, e.g., transmitted at one subcarrier on reference signal, RS, transmission (for example, one subcarrier of one demodulation reference signal—DMRS—symbol).

Thus, the apparatuses presented herein (e.g., FIGS. 3-7) allow directly measuring the calibration coefficients which, in turn, enable reciprocity-based operation via calibration.

The inversion may be implemented in any suitable manner. For example, the inversion functionality may be achieved by a sequence of two functional blocks—a log-amplifier and an exponential function circuit—with both functional blocks implemented using operational amplifiers and standard active and passive electronic components.

For example, the inversion (see, e.g., FIG. 6) may be implemented using a radio frequency (RF) circuit. The (equivalent baseband) functionality f( ) of such a RF circuit is to invert an input x, and can be expressed as:

$$f(x) = \frac{1}{x} = k_1(x) k_2(x),$$

where $k_1(x) = x^*$ and $k_2(x) = 1/|x|^2$. Thus, the inversion can be performed in two steps: complex conjugation $k_1(x)$, and normalization $k_2(x)$ by the energy of the input.

As noted previously, the normalization may be implemented by a scaler (compare with 601 of FIG. 6 and 723 of FIG. 7) with a pre-tabulated fixed scaling $k_2$ if $$f(x) \approx k_1(x) k_2.$$

If the input signal p=1, $x = t_m^{BS}$ and $k_2(t_m^{BS}) = 1/|t_m^{BS}|^2$. The transmitter gain $t_m^{BS}$ can vary with temperature and most of the variation is observed in the phase component. In order to ensure a controlled output power per antenna, the magnitude $|t_m^{BS}|$ and its energy $|t_m^{BS}|^2$ are both typically predefined and have low variations by design. Therefore, for practical purposes, $k_2(t_m^{BS})=1/|t_m^{BS}|^2 \approx k_2$ can be assumed to be a known constant.

The phase conjugation circuit implementing $k_1(x)=x^*$ will now be exemplified. Furthermore, various relevant RF implementations may be found in the literature, and an overview of phase conjugation circuits is provided by Lei Chen, Yu Chun Guo, Xiao Wei Shi, and Tian Ling Zhang, "Overview on the Phase Conjugation Techniques of the Retrodirective Array," International Journal of Antennas and Propagation, vol. 2010, Article ID 564357.

As noted previously, the conjugation may comprise mixing the analog signal with a tone having a frequency which is twice of a carrier frequency and applying a filter passing the carrier frequency, which may be implemented by a phase conjugation circuit comprising a mixer (multiplying its input with $\cos(2\omega t)$, where $\omega$ represents the carrier frequency) and—possibly—a low pass filter (LPF).

If the input RF tone is denoted as $V_{IN} \cos(\omega t+\phi)$ and the mixing tone based on the local oscillator (LO) is denoted as $V_{LO} \cos(2\omega t)$, the mixer output signal may be expressed as:

$$V_{IN}V_{LO}\cos(\omega t + \phi)\cos(2\omega t) = \underbrace{V_{IN}V_{LO}\cos(\omega t - \phi)}_{\text{desired signal}} + \underbrace{V_{IN}V_{LO}\cos(3\omega t + \phi)}_{\text{undesired signal}}.$$

The undesirable signal at the output of the mixer (with three times the carrier frequency) is filtered out using the LPF, or in the low noise amplifier (LNA) of the receiver path, or even after down conversion in the receiver path. The desired signal, viewed in equivalent complex baseband, is the complex conjugated version of the transmit signal.

The LPF could also act as a scaler so that the desired signal entering the receiver path does not saturate its low noise amplifier (LNA). Preferably, the roll-off requirements for the LPF filter in the phase conjugation circuit are very relaxed.

Phase and frequency coherency between the LO signal and mixer input signal can be obtained by using the same signal reference for all transceiver chains, and for transmission/reception up/down-conversion.

As also noted previously, the conjugation may—alternatively—comprise mixing the analog signal with a tone having a carrier frequency, wherein a quadrature component is negated, and applying a phase compensation factor, which may be implemented by distributed inversion circuitry (exemplified by FIG. 7).

The distributed inversion circuitry comprises scaling (e.g., implemented as a scaler in the connection circuit between transmitter and receiver paths), a 180 degree phase shift of the quadrature carrier component in the receiver path down-conversion mixer, and post-processing (e.g., in the digital domain of the receiver path) for phase compensation of un-calibrated, slowly time-varying or stationary, hardware components.

The scaler can ensure that the receiver path LNA is not saturated during the measurement, and acts as the $k_2(x) \approx k_2$ term mentioned before. Thus, the receiver path measured signal provided by insertion of the scaler may be expressed as:

$$h_{meas}^{(1)} = \alpha t_m^{BS} r_m^{BS} / |t_m^{BS}|^2.$$

The scaler should typically be designed with certain phase accuracy, so that the gain of the channel created by this circuit is a real scalar $\alpha/|t_m^{BS}|^2$. If such implementation is done via a transmission line, this requirement can be met by using a transmission line, the electrical length of which is a multiple of the used wavelength.

To implement the conjugation, a 180 degree phase shift may be applied to the quadrature component of the receiver path carrier used for down-conversion.

During conventional carrier demodulation, the quadrature component (compare with 706 of FIG. 7) is phase shifted +90 de-grees with respect to the in-phase component. In order to obtain a measurement representative of $c_m$, the sign of the quadrature component is flipped so that it becomes phase shifted −90 degrees with respect to the in-phase component.

This has the effect of conjugating the (complex) response of all components before the receiver path mixer, including the transmitter and receiver components upstream from the receiver path mixer (compare with 727 of FIG. 7; e.g., LNA and preselection filter). Thus, the receiver path measured signal provided by insertion of the scaler may be expressed as:

$$h_{meas}^{(2)} = \alpha(t_m^{BS})^*(r_m^{(1)})^* r_m^{(2)} / |t_m^{BS}|^2 = \alpha(r_m^{(1)})^* r_m^{(2)} / t_m^{BS},$$

if the receiver path gain is factorized as $r^{BS} = r_m^{(1)} r_m^{(2)}$, where $r_m^{(1)}$ corresponds to receiver response of components upstream of the receiver path mixer (compare with 727 of FIG. 7) and $r_m^{(2)}$ corresponds to receiver response of components downstream of the receiver path mixer (compare with 729 of FIG. 7). To complete the conjugation and achieve $c_m = \alpha r_m^{BS}/t_m^{BS}$, the phase factor:

$$c_m/h_{meas}^{(2)} = r_m^{(1)}/(r_m^{(1)})^* = e^{j2\phi}$$

is dealt with by post-processing. One way to deal with $e^{j2\phi}$ is to measure it and tabulate it off-line for different temperatures, and then post-process during run-time measurements by "back-rotating" $h_{meas}^{(2)}$ with $e^{j2\phi}$. Since the response of components upstream of the receiver path mixer (e.g., RF devices such as LNA and RF filter) typically varies slowly with time, mostly as a function of temperature, and is smooth in frequency domain, off-line tabulating is feasible.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a multi-antenna transceiver (e.g., a wireless communication device, which may be a user equipment or a network node, for example).

Embodiments may appear within an electronic apparatus (such as a multi-antenna transceiver) comprising arrangements, circuitry, and/or logic according to any of the embodiments described herein. Alternatively or additionally, an electronic apparatus (such as a multi-antenna transceiver) may be configured to perform methods according to any of the embodiments described herein.

Figure 8:
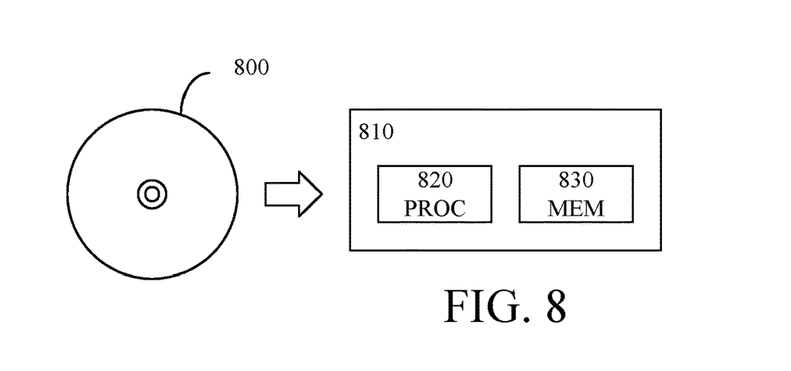
FIG. 8 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 8 illustrates an example computer readable medium in the form of a compact disc (CD) ROM 800. The computer readable medium has stored thereon a computer program comprising program instructions. The computer program is loadable into a data processor (PROC; e.g., data processing circuitry or a data processing unit) 820, which may, for example, be comprised in a multi-antenna transceiver 810. When loaded into the data processor, the computer program may be stored in a memory (MEM) 830 associated with or comprised in the data processor. According to some embodiments, the computer program may, when loaded into and run by the data processor, cause execution of method steps according to, for example, any of the methods illustrated in FIG. 2 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method of beamforming calibration for a multi-antenna transceiver configured to communicate with one or more other transceivers, the multi-antenna transceiver having a plurality of transceiver chains connectable to respective antenna elements of the multi-antenna transceiver, and each transceiver chain comprising a transmitter path and a receiver path, the method comprising, for each transceiver chain:
feeding an analog signal from the transmitter path to the receiver path via connection circuitry between the transmitter path and the receiver path to provide a digital calibration signal, wherein the digital calibration signal corresponds to an inversion of the analog signal being passed through the receiver path; and
determining a beamforming calibration factor for the transceiver chain based on the digital calibration signal.

2. The method of claim 1, wherein the inversion of the analog signal is provided by conjugating and normalizing the analog signal.

3. The method of claim 2, wherein normalizing the analog signal comprises scaling the analog signal.

4. The method of claim 2, wherein conjugating the analog signal comprises mixing the analog signal with a tone having a frequency which is twice of a carrier frequency and applying a filter passing the carrier frequency.

5. The method of claim 3, wherein conjugating the analog signal comprises mixing the analog signal with a tone having a carrier frequency, wherein a quadrature component is negated, and applying a phase compensation factor.

6. The method of claim 1, further comprising compensating a digital reception signal, resulting from the analog signal being fed from the transmitter path to the receiver path via the connection circuitry, based on a corresponding digital transmission signal to provide the digital calibration signal.

7. The method of claim 1, wherein each beamforming calibration factor represents a ratio between receiver path gain and transmitter path gain for a corresponding transceiver chain.

8. The method of claim 1, further comprising performing channel estimation.

9. The method of claim 8, further comprising beamforming a communication signal based on the channel estimation and based on the determined beamforming calibration factors, and transmitting the communication signal to the one or more other transceivers.

10. A non-transitory computer readable medium, having thereon a computer program comprising program instructions, the computer program being loadable into a data processing unit and configured to cause execution of a method when the computer program is run by the data processing unit, wherein the method is for beamforming calibration for a multi-antenna transceiver configured to communicate with one or more other transceivers, the multi-antenna transceiver having a plurality of transceiver chains connectable to respective antenna elements of the multi-antenna transceiver, and each transceiver chain comprising a transmitter path and a receiver path, the method comprising, for each transceiver chain:
feeding an analog signal from the transmitter path to the receiver path via connection circuitry between the transmitter path and the receiver path to provide a digital calibration signal, wherein the digital calibration signal corresponds to an inversion of the analog signal being passed through the receiver path; and
determining a beamforming calibration factor for the transceiver chain based on the digital calibration signal.

11. An apparatus for beamforming calibration of a multi-antenna transceiver configured to communicate with one or more other transceivers, the apparatus comprising:
a plurality of transceiver chains connectable to respective antenna elements of the multi-antenna transceiver, each transceiver chain comprising:
a transmitter path and a receiver path; and
feeding circuitry, including connection circuitry between the transmitter path and the receiver path, configured to feed an analog signal from the transmitter path to the receiver path via the connection circuitry to provide a digital calibration signal as corresponding to an inversion of the analog signal being passed through the receiver path; and controlling circuitry configured to cause for each of the transceiver chains determination of a beamforming calibration factor for the transceiver chain based on the corresponding digital calibration signal.

12. The apparatus of claim 11, wherein the feeding circuitry is configured to conjugate and normalize the analog signal to provide the inversion of the analog signal.

13. The apparatus of claim 12, wherein the feeding circuitry is configured to scale the analog signal to normalize the analog signal.

14. The apparatus of claim 12, wherein the feeding circuitry is configured to mix the analog signal with a tone having a frequency which is twice of a carrier frequency and apply a filter passing the carrier frequency to conjugate the analog signal.

15. The apparatus of claim 12, wherein the feeding circuitry is configured to mix the analog signal with a tone having a carrier frequency, wherein a quadrature component is negated, and apply a phase compensation factor to conjugate the analog signal.

16. The apparatus of claim 11, wherein the controlling circuitry is further configured to cause compensation of a digital reception signal, resulting from the analog signal being fed from the transmitter path to the receiver path via the connection circuitry, based on a corresponding digital transmission signal to provide the digital calibration signal.

17. The apparatus of claim 11, wherein each beamforming calibration factor represents a ratio between receiver path gain and transmitter path gain for a corresponding transceiver chain.

18. The apparatus of claim 11, wherein the controlling circuitry is further configured to cause channel estimation.

19. A multi-antenna transceiver comprising the apparatus of claim 11.

20. A wireless communication device comprising the apparatus of claim 11.

* * * * *